(12) United States Patent
Atsuumi

(10) Patent No.: US 6,892,844 B2
(45) Date of Patent: May 17, 2005

(54) COOLANT PUMP FOR SNOWMOBILE ENGINE

(75) Inventor: Mamoru Atsuumi, Shizuoka (JP)

(73) Assignee: Yamaha Hatsukoki Kabushiki Kaisha, Shizuoka (JP)

( * ) Notice: Subject to any disclaimer, the term of this patent is extended or adjusted under 35 U.S.C. 154(b) by 79 days.

(21) Appl. No.: 10/096,979

(22) Filed: Mar. 13, 2002

(65) Prior Publication Data

US 2002/0148661 A1 Oct. 17, 2002

(30) Foreign Application Priority Data

Mar. 14, 2001 (JP) ........................................ 2001-072974

(51) Int. Cl.$^7$ ............................................ B62M 27/02
(52) U.S. Cl. ........................ 180/190; 415/120; 415/180
(58) Field of Search ................................ 415/204, 205, 415/206, 120, 180; 180/190, 186; 417/366; 123/41.01, 41.44

(56) References Cited

U.S. PATENT DOCUMENTS

| | | | | |
|---|---|---|---|---|
| 4,155,333 A | * | 5/1979 | Maggiorana | ............. 123/41.44 |
| 5,078,105 A | | 1/1992 | Ito et al. | ................. 123/195 R |
| 5,113,807 A | | 5/1992 | Kobayashi | ............... 123/41.74 |
| 5,172,786 A | * | 12/1992 | Ishibashi et al. | ............. 180/190 |
| 5,279,265 A | * | 1/1994 | Matsuo et al. | ............ 123/41.44 |
| 5,732,667 A | | 3/1998 | Sakurai | .................... 123/41.44 |
| 5,885,121 A | | 3/1999 | Nanami et al. | ............ 440/88 R |
| 5,899,662 A | * | 5/1999 | Hojyo et al. | ................. 415/206 |
| 6,109,217 A | * | 8/2000 | Hedlund et al. | .......... 123/41.01 |
| 6,196,166 B1 | | 3/2001 | Yonezawa | ................. 123/41.01 |
| 6,428,288 B1 | * | 8/2002 | King | ............................ 417/366 |
| 2002/0134603 A1 | * | 9/2002 | Ashida et al. | .............. 180/186 |
| 2002/0148662 A1 | * | 10/2002 | Ashida et al. | .............. 180/190 |

FOREIGN PATENT DOCUMENTS

IT WO 93/06372 * 4/1993 ............. F04D/5/00

* cited by examiner

*Primary Examiner*—Lesley D. Morris
*Assistant Examiner*—Daniel Yeagley
(74) *Attorney, Agent, or Firm*—Knobbe, Martens, Olson & Bear LLP

(57) ABSTRACT

A coolant pump for an engine includes a pump case main body and a pump drive shaft journaled therein. The pump drive shaft has a plurality of blades mounted thereon and is rotatable about a pump drive shaft axis. The coolant pump also includes a partition member and a lid. The partition member and the pump case main body define a pump chamber configured to house the blades. The partition member also defines a pump chamber inlet port. A fluid inlet chamber is defined by the partition member and the lid. The fluid inlet chamber provides fluid communication between a fluid inlet port and the pump chamber inlet port.

25 Claims, 12 Drawing Sheets

COOLANT PUMP FOR SNOWMOBILE ENGINE

RELATED APPLICATIONS

This application is based upon and claims the priority of Japanese Patent Application No. 2001-072974, filed on Mar. 14, 2001.

BACKGROUND OF THE INVENTION

1. Field of the Invention

The present invention generally relates to a cooling system for land vehicles. More specifically, the present invention relates to an improved coolant pump for snowmobiles that is more compact than conventional coolant pumps such that the overall engine and vehicle body can be made smaller.

2. Description of the Related Art

Snowmobiles are powered by internal combustion engines that are mounted within a substantially enclosed engine compartment forward of the rider's seat. The engine compartment typically is defined within a cowling and is generally relatively small. Although operated in a relatively cold environment, components of such engines often get quite hot. Accordingly, such engines often employ a cooling system.

One type of cooling system employed to maintain a reasonably cool running temperature is a liquid coolant cooling system. Such a system will often employ a coolant pump to circulate liquid coolant within the engine. One type of coolant pump is a centrifugal pump that has a fluid inlet port located on a lid. To accommodate the incoming fluid that flows through the fluid inlet port, the lid is sometimes provided with a protruding inlet conduit that extends away from the rest of the pump in one direction. The inlet conduit is then routed using a ninety degree bend so that the coolant flows toward the pump in a direction parallel to the plane of the lid. This arrangement is unsatisfactory because it results in a pump that is large in size. The relatively large size pump is unsatisfactory because it can interfere with other components that are mounted in the vicinity of the pump.

To avoid such interference, the size of the engine can be increased. However, the larger engine may not fit within the small engine compartment of the snowmobile or may interfere with other components of the snowmobile located forward of the seat.

SUMMARY OF THE INVENTION

Thus, a centrifugal pump that has a lower profile and that therefore takes up less space in the engine body and in the engine compartment is desired.

Accordingly, one aspect of the present invention involves a snowmobile that has a frame assembly and an internal combustion engine. The frame assembly defines an imaginary longitudinal vertical plane and an imaginary transverse vertical plane. The internal combustion engine is mounted to the frame assembly generally along the transverse vertical plane. The internal combustion engine has a cylinder block defining a cylinder bore and a crankcase connected to the cylinder block. The crankcase defines a crankcase chamber. The crankcase has a crankshaft journaled therein. The crankshaft is rotatable about a crankshaft axis. A piston is reciprocally positioned in the cylinder bore and drives the crankshaft. A cooling system includes a centrifugal coolant pump. The coolant pump is located in the crankcase and has a coolant pump housing that defines a pump chamber. The pump chamber is in fluid communication with a fluid inlet port. A pump drive shaft is journaled in the pump housing. The pump drive shaft has at least one blade mounted thereon. The blade is positioned within the pump chamber. The pump drive shaft is rotatable about a pump drive shaft axis. The fluid inlet port is offset from the pump drive shaft axis.

Another aspect of the present invention involves a coolant pump for an engine cooling system. The coolant pump includes a pump case main body and a pump drive shaft journaled in the pump case main body. The pump drive shaft has a plurality of blades mounted thereon and is rotatable about a pump drive shaft axis. The coolant pump also includes a partition member and a lid. The partition member has an upper portion. The partition member and the pump case main body define a pump chamber configured to house the blades. The partition member also defines a pump chamber inlet port. A fluid inlet chamber is defined by the partition member and the lid. The fluid inlet chamber provides fluid communication between a fluid inlet port and the pump chamber inlet port.

BRIEF DESCRIPTION OF THE DRAWINGS

These and other features, aspects and advantages of the present invention will be better understood with reference a preferred embodiment, which is illustrated in the accompanying drawings. The illustrated embodiment is merely exemplary and is not intended to define the outer limits of the scope of the present invention. The drawings of the illustrated arrangement comprise thirteen figures.

DETAILED DESCRIPTION OF THE PREFERRED EMBODIMENT

Figure 1:
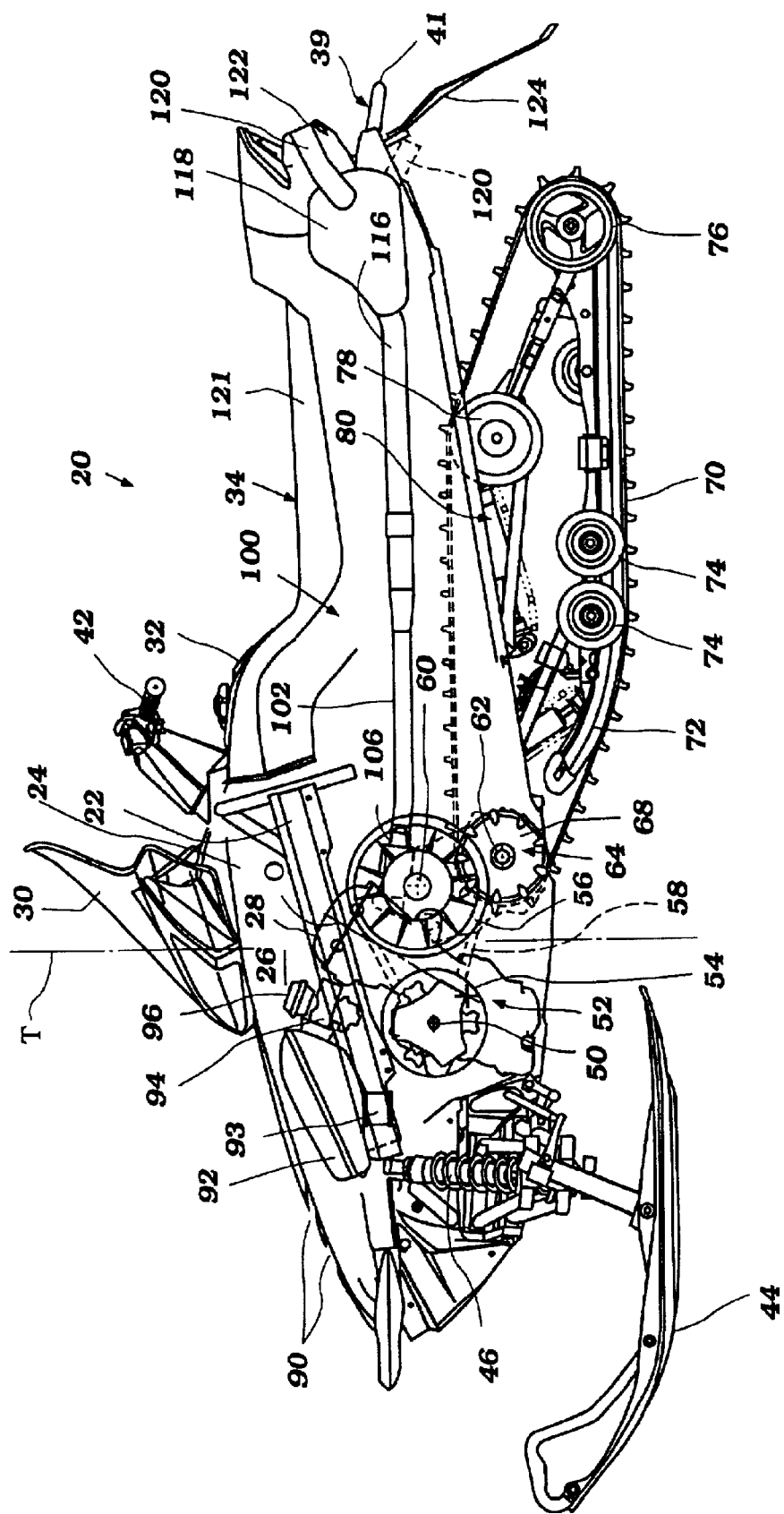
FIG. 1 is a side elevation view of one embodiment of a snowmobile with certain portions broken away and other internal portions shown in hidden line to better illustrate certain features, aspects and advantages of the present invention.

With reference now to FIG. 1, a snowmobile having certain features, aspects and advantages of the present invention will be described. The snowmobile, indicated generally by the reference numeral 20, is an environment for which many features, aspects and advantages of the present invention have been specially adapted. Nevertheless, certain features, aspects and advantages of the present invention can be used with other vehicles, such as all-terrain vehicles and watercraft.

The snowmobile 20 generally comprises a frame assembly 22 (see FIGS. 1, 3, and 4) that carries a number of other components of the snowmobile 20. A forward body cover 24 is disposed over a forward portion of the frame assembly 22. The forward body cover 24 defines, in part, an engine compartment 26 in which an engine 28 is mounted. The engine 28 is mounted to the frame assembly 22 in a manner described below in connection with FIGS. 3 and 4. The engine 28 will be described in greater detail below in connection with FIGS. 2 and 3.

A windshield 30 is disposed over a mid-portion of the body cover 24. The windshield 30 provides some degree of protection for the riders from wind and other elements during operation of the snowmobile 20. Rearward of the windshield 30, a fuel tank 32 is mounted to the frame assembly 22 in a manner that allows the body cover 24 and the fuel tank 32 to blend together for aesthetic reasons.

Rearward of the fuel tank 32, a seat 34 is mounted to the frame assembly 22. A right-side step, or foot-rest 36, is attached to the right-hand side of the frame 22 of the snowmobile 20. A left-side step, or foot-rest 38, is attached to the left-hand side of the frame 22 of the snowmobile 20. As used herein, "right," "right-hand," "right-side," "left," "left-hand," and "left-side" are defined from the perspective of a rider on the seat 34 facing forward. Rearward of the seat 34 is positioned a grab bar 39 that comprises a grabbing portion 41 that can be used to raise a rear portion of the snowmobile for turning and maneuvering when the snowmobile is not being ridden. While the illustrated grab bar 39 is generally U-shaped and is mounted in a generally horizontal manner, other forms of grab bars can be used. For instance, the grab bar 39 can be loops, semicircular, vertical or inclined in orientation. In short, any suitable grab bar construction can be used.

Forward of the seat 34 and the fuel tank 32 is a steering handle assembly 42. The handle assembly 42 can carry appropriate controls and can be coupled to a pair of front skis 44. Manipulation of the handle assembly 42 causes the direction of the snowmobile 20 to be altered in a known manner. The skis 44 are mounted to the frame assembly 22 though a front suspension assembly 46. Any suitable front suspension assembly 46 can be used.

The engine 28 in the illustrated arrangement is an inclined L-4 four-cycle engine that is mounted transversely within the engine compartment 26. In other words, the illustrated engine 28 comprises four cylinder bores that extend side-by-side across a width of the snowmobile 20. The cylinder bores each comprise a center axis O that is inclined relative to vertical. In some arrangements, engines having differing numbers of cylinder bores, different cylinder bore configurations (e.g., V, opposing, etc.), different orientations (e.g., vertical) and different operating principles (e.g., two-stroke, rotary, etc.) can be used.

The engine 28 also comprises an output shaft 50. The output shaft 50 drives a transmission, which is a continuously variable transmission 52 in the illustrated arrangement. Other transmissions also can be used. In the illustrated arrangement, the output shaft 50 rotates a drive pulley 54. The output shaft 50 and the drive pulley 54 can be connected together through a clutch, a centrifugal clutch, a sprag clutch or can be directly connected together.

The drive pulley 54 powers a driven pulley 56 with a v-belt 58 in the illustrated arrangement. In some configurations, a drive chain can be used in place of the v-belt 58. Other arrangements also can be used. The driven pulley 56 is connected to and rotates about a transfer shaft 60. In the illustrated arrangement, the transfer shaft 60 carries a sprocket (not shown) at the end opposite to the driven pulley 56. The sprocket is connected to a further sprocket that is carried by a drive shaft 62.

The drive shaft 62 powers a drive unit 64. The drive unit 64 generally comprises a plurality of drive wheels 68. The drive wheels 68 provide a motive force to a drive belt 70, which is commonly used in the snowmobile industry.

With continued reference to FIG. 1, the drive belt 70 is guided around a preferred path on a pair of slide rails 72, a plurality of suspension wheels 74 and main rear suspension wheels 76. The slide rails 72 preferably support the suspension wheels 74 and the main rear suspension wheels 76. An idler roller 78 preferably is mounted to the frame assembly 22 and helps to define the preferred path for the drive belt 70. As is known in the snowmobile industry, these components can be mounted to the frame assembly with a rear suspension system 80. Any suitable rear suspension system 80 can be used and certain portions of the rear suspension system 80 have been schematically illustrated in the illustrated arrangement.

Many of the above-described components are generally conventional and can be arranged and configured in any suitable manner. Additionally, the above-described components can be replaced by other suitable components where desired. Any details omitted to this point have been considered well within the design knowledge of those of ordinary skill in the art.

With continued reference to FIG. 1, air is drawn into the engine compartment 26 through suitable air passages. In some arrangements, the air is drawn through ventilation openings 90 formed in the body cover 24. The air drawn or forced into the engine compartment 26 circulates about the engine 28 and related drive components to help cool the engine 28 and the related drive components.

The air also is drawn into an air intake box 92. The air intake box 92 is disposed forward of the engine 28 in the illustrated arrangement. The air intake box 92 can be mounted to the frame assembly 22 in any suitable manner. An air inlet 93 into the air intake box 92 can extend upward into a lower surface of the air intake box 92.

A set of intake runners 94 extends between the illustrated air intake box 92 and the engine 28. Preferably, a charge former 96 is disposed along each of the intake runners 94. Advantageously, the intake runners 94 extend directly rearward to the engine 28 rather than wrapping around the engine 28 and mating with a rearward-facing surface of the engine 28. The charge formers 96 preferably correspond to each cylinder bore. In some arrangements, a single charge former can be used upstream of a separation point for runners extending to individual cylinder bores. In addition, in the illustrated arrangement, the engine 28 is carbureted. In some arrangements, the charge formers 96 can be fuel injectors that are mounted for direct injection, indirect injection or port injection. The air-fuel charge provided in this manner is combusted in a conventional manner, e.g., by spark plugs 99 (see FIG. 2).

The combustion byproducts then are exhausted through a suitable exhaust system 100. In the illustrated arrangement, the exhaust system 100 extends directly rearward from the engine 28. In this manner, an exhaust runner 102 that extends rearward from the engine can be tuned to the engine for improved engine performance. Additionally, the length of each runner 102 can be lengthened prior to merging together with any other runners such that pulse effects on adjoining cylinder bores can be reduced. In some arrangements, an attenuation chamber or passage between two or more runners can be used to reduce the effect of reflected pressure pulses in the exhaust system.

With continued reference to FIG. 1, the exhaust system 100 preferably comprises the exhaust runners 102 that correspond to each cylinder bore and that extend generally rearward from the engine. Each exhaust runner 102 is coupled to an exhaust discharge pipe 106 that is individually joined to the engine in the illustrated arrangement. In some arrangements, a single manifold can be used. At least two of the runners 102 join at a merge location (not shown) and the merged flow passes through a manifold pipe 116.

The manifold pipes 116 extend rearward to a silencer box 118. The silencer box 118 provides an enlarged volume into which the exhaust can flow. Exhaust energy is dissipated within the silencer box 118 and the noise level of the exhaust can be decreased. In the illustrated arrangement, the silencer box 118 is disposed below a portion of the seat 34 that is rearward of a rider section 121 of the seat.

A pair of exhaust pipes 120 extends rearward from the silencer box 118. In some arrangements, a single exhaust pipe 120 can extend from the silencer box 118. Other numbers of exhaust pipes also can be used. One end of each of the exhaust pipes 120 preferably defines an ultimate exhaust discharge 122 from the snowmobile 20 such that the exhaust gases are discharged into the atmosphere at this location. As illustrated in FIG. 1, the exhaust pipes 120 can extend upwardly and rearwardly from the silencer box 118 while, in another arrangement, shown in hidden lines, the exhaust pipes 120 can extend downward to a location forward of a protective flap 124. Preferably, the exhaust pipes 120 terminate at a location forward of the grab portion 41 of the grab bar 39.

Figure 2:
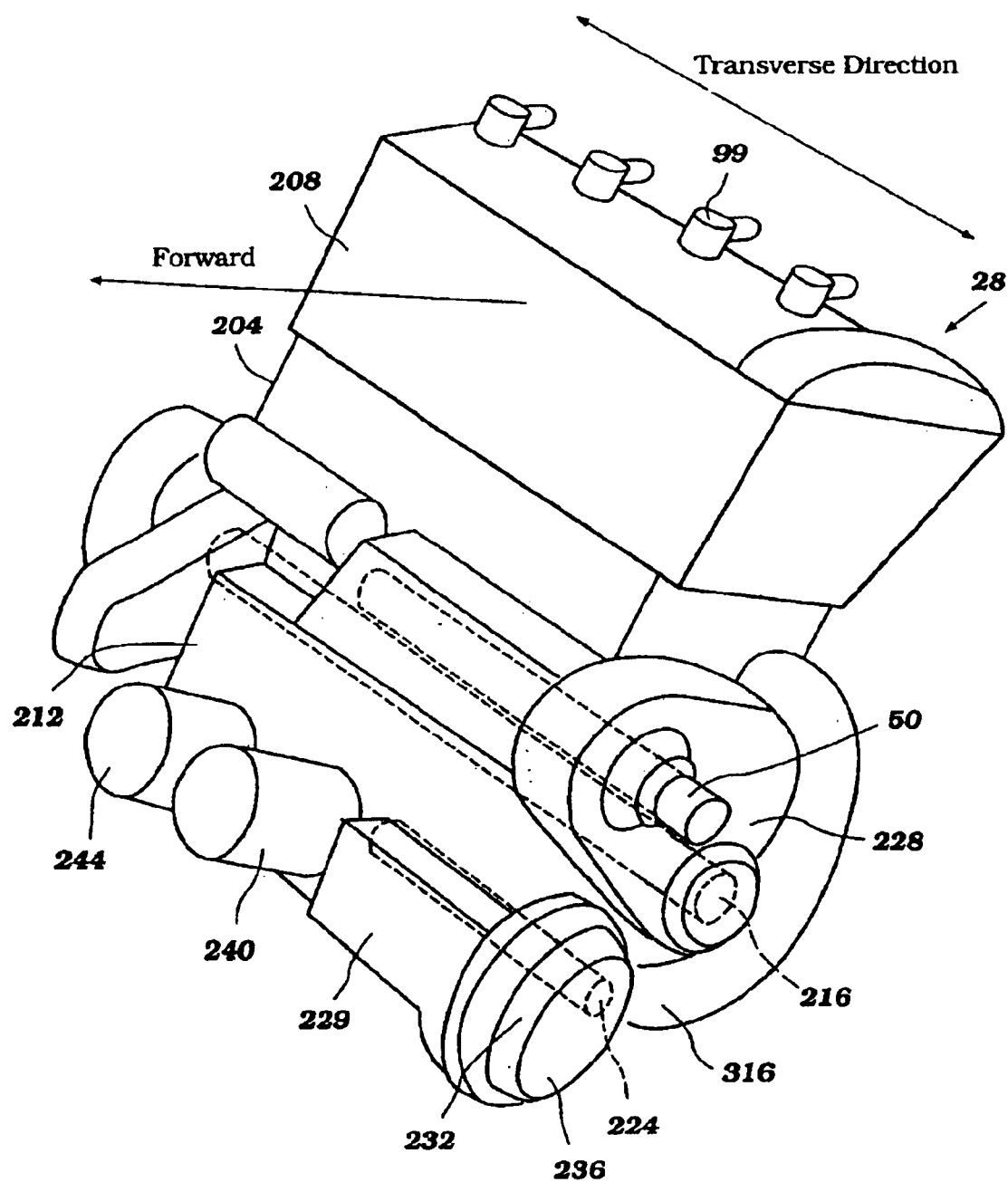
FIG. 2 is a schematic top, front, and side perspective view of an engine of the snowmobile of FIG. 1.

With reference now to FIG. 2, the engine 28 of the illustrated snowmobile 20 will be described in greater detail. The engine 28 includes a cylinder block 204 that defines four combustion bores (not shown) spaced from each other transversely across the snowmobile 20. A piston (not shown) reciprocates within each of the cylinder bores. The engine 28 also includes a cylinder head member 208 that is attached to an upper surface of the cylinder block 204 to close respective upper ends of the cylinder bores and thus define combustion chambers (not shown) with the cylinder bores and the pistons, as is known. The engine 28 also includes a crankcase member 212 that is affixed to the lower end of the cylinder block 204 to define a crankcase chamber (not shown).

The engine 28 also includes a crankshaft 216 and an auxiliary shaft 224. The crankshaft 216 is journaled in the crankcase member 212 and is rotatably coupled to the pistons, e.g., through a connecting rod. The output shaft 50 is rotatably coupled to the crankshaft 216 in a suitable manner, e.g., through a gear pair mounted proximate a lateral side of the engine 28. Rotational motion of the crankshaft 216 is thus transmitted to the output shaft 50 and through the transmission 52 to the drive belt 70 of the snowmobile 20 to provide motive force for the snowmobile 20. A crankshaft cover 228 is provided on the lateral side of the crankcase member 212 of the engine 28. The crankshaft cover 228 covers the crankshaft 216 and the members, e.g., the gears, that roatably couple the crankshaft 216 and the output shaft 50.

The auxiliary shaft 224, in one embodiment, is also journaled in the crankcase member 212. In one embodiment, the auxiliary shaft 224 is rotatably coupled to the output shaft 50. The auxiliary shaft 224 drives a coolant pump 304 in one embodiment. One embodiment of the cooling pump 304 is discussed in greater detail in connection with a cooling system 300 illustrated in FIGS. 3–12. In another embodiment, the auxiliary shaft 224 also drives a lubricant pump unit (not shown). The output shaft 50 preferably drives the auxiliary shaft 224 via an auxiliary drivetrain (not shown) in a suitable manner. In one embodiment, a drive sprocket is mounted on the output shaft 50, a driven sprocket is mounted on the auxiliary shaft 224, and a flexible transmitter is wound around both sprockets. When the output shaft 50 rotates, the sprocket associated with the output shaft 50 rotates. This rotational motion is transmitted to the sprocket associated with the auxiliary shaft 224 by the flexible transmitter. Thus the rotation of the output shaft 50 is transmitted to the auxiliary shaft 224.

In one embodiment, several other components of the engine 28 are located on or near the forward facing side of the crankcase 212. A lubricant pump housing 229 is provided at an elevation that is generally below the output shaft 50. The lubricant pump housing 229 is configured to enclose the lubricant pump unit (not shown). In one embodiment, a coolant pump housing 232 is provided adjacent to the lubricant pump housing 229 to at least partially house the coolant pump 304. In one embodiment, a coolant pump housing cover 236 is provided on one side of the crankcase 212 to enclose at least the coolant pump 304 and the auxiliary shaft 224. A lubricant filter 240 and a lubricant cooler 244 are also mounted on a forward facing side of the engine 28.

Figure 3:
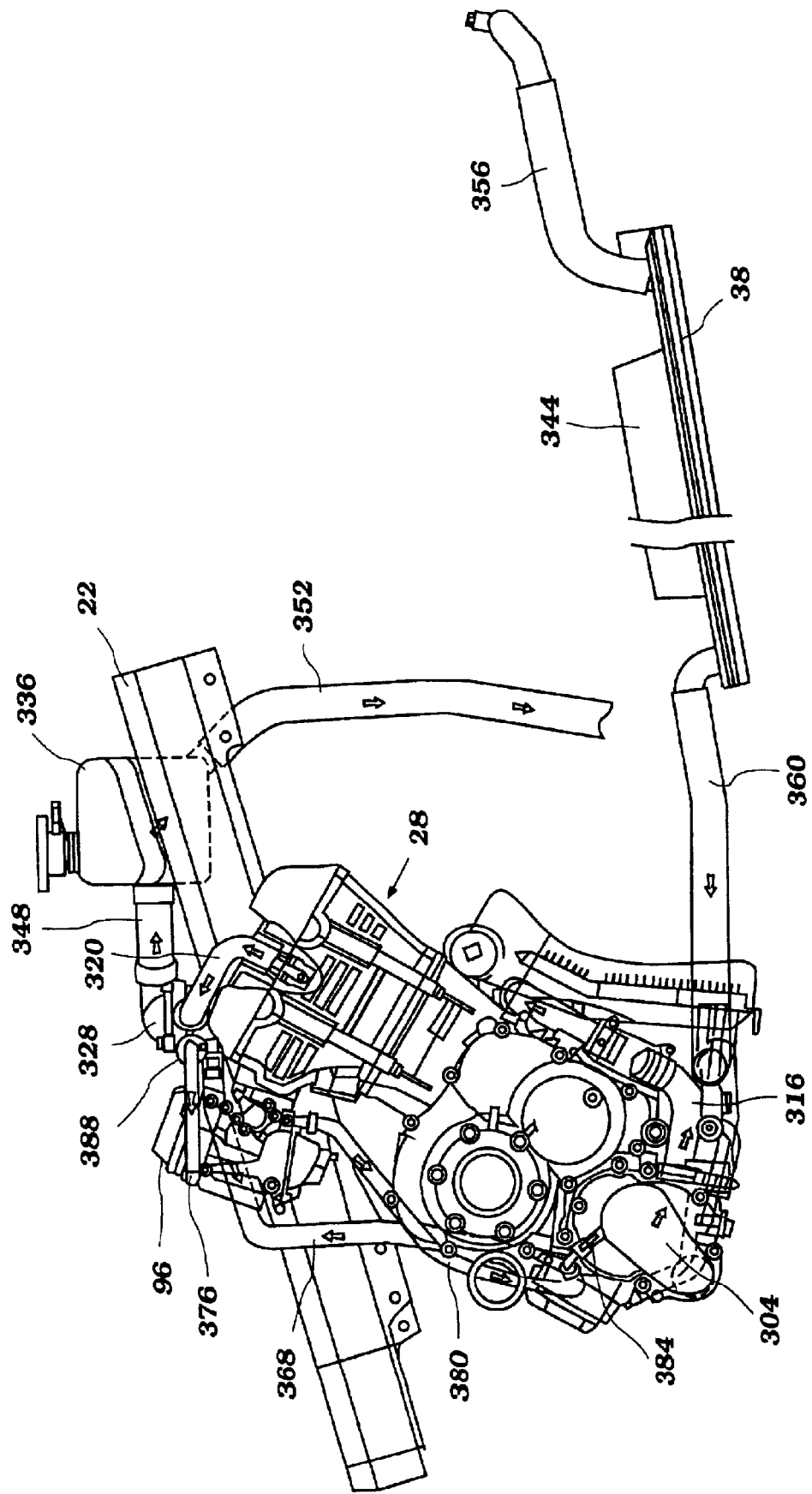
FIG. 3 is a side elevation view of one embodiment of a cooling system of an engine of the snowmobile of FIG. 1.
Figure 4:
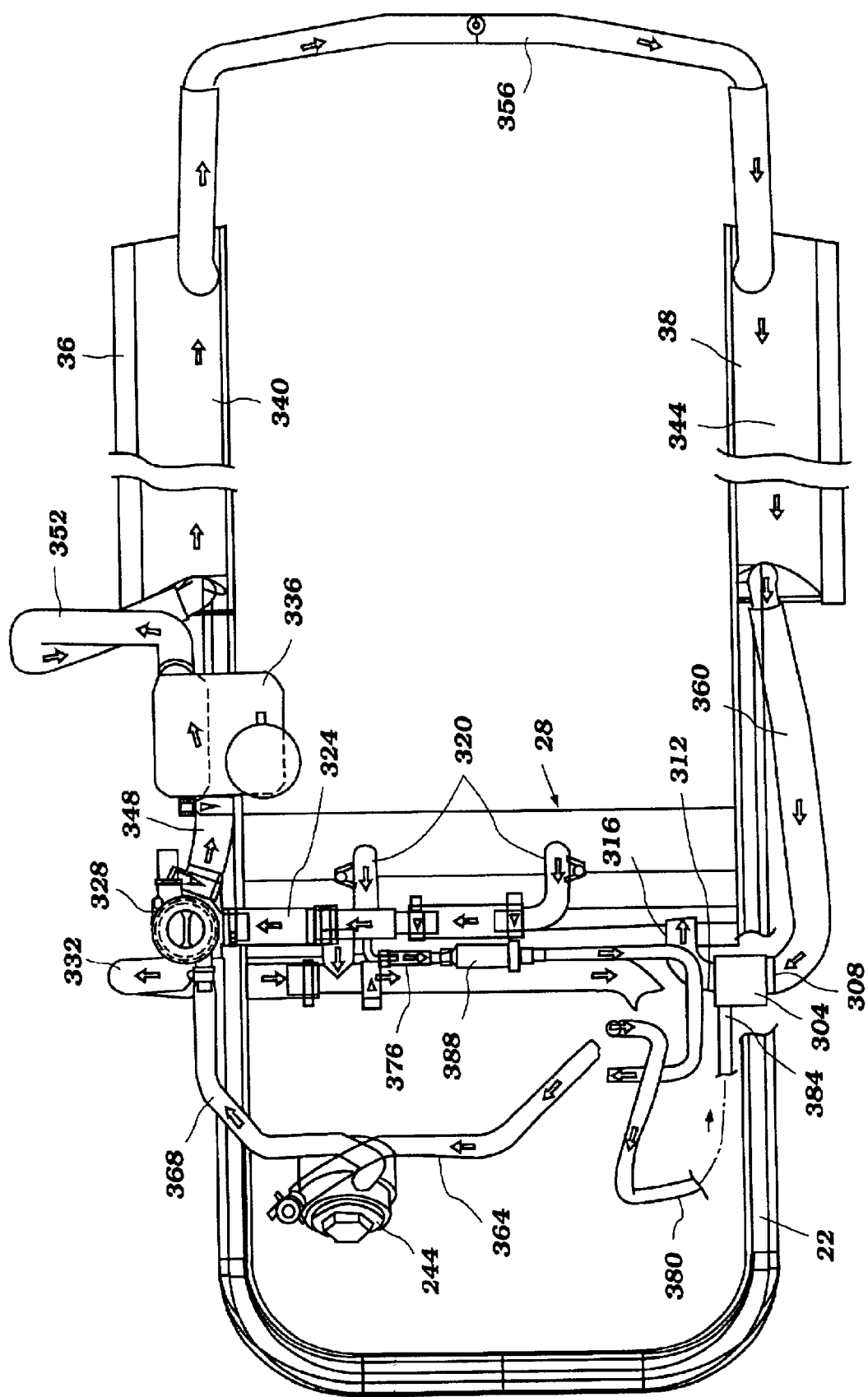
FIG. 4 is a top view of the cooling system of FIG. 3.
Figure 5:
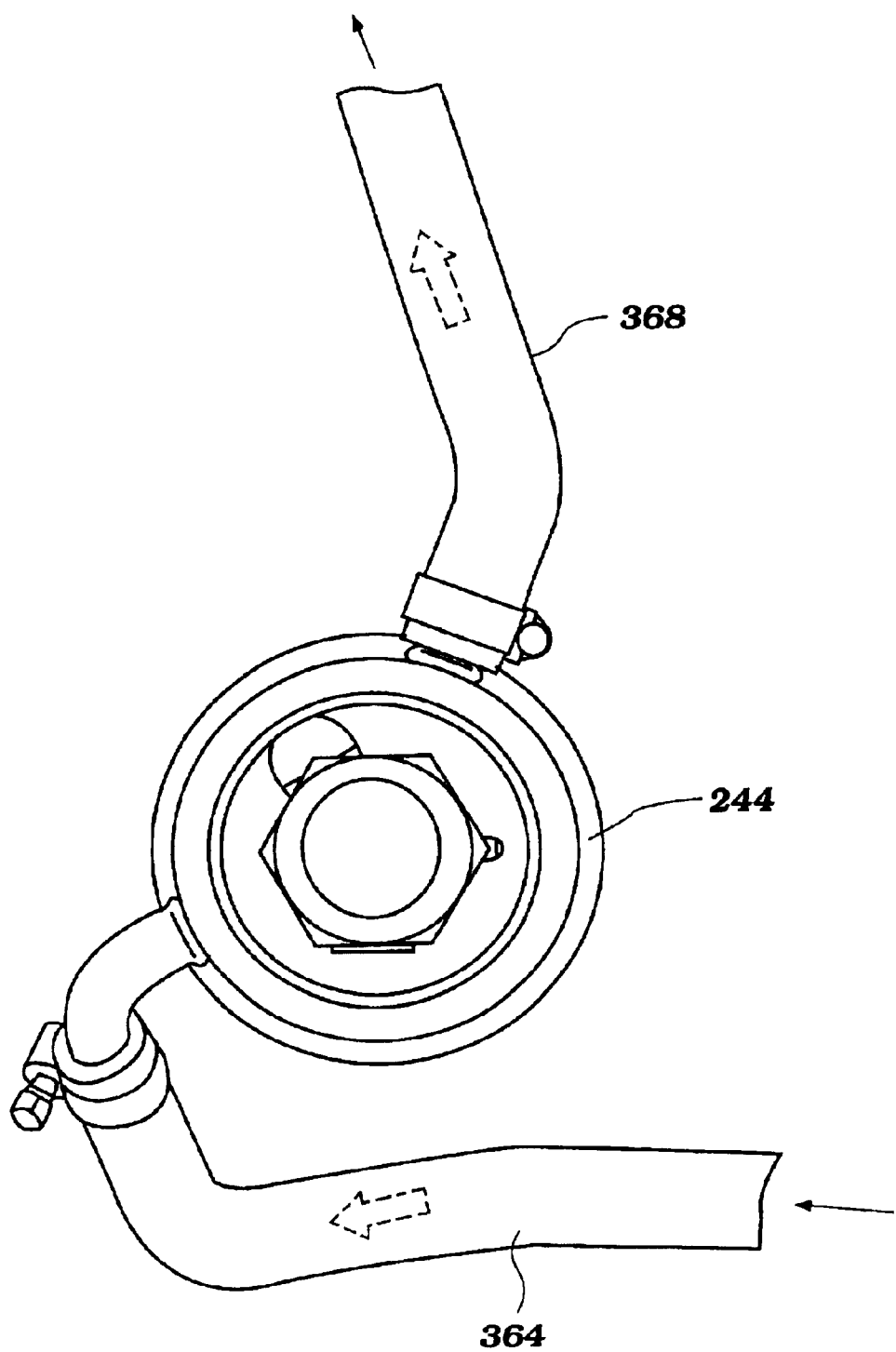
FIG. 5 is a top view of one embodiment of a lubricant cooler of the engine of FIG. 2.

With reference now to FIGS. 3–5, the engine 28 of the includes a cooling system 300 that is connected to the frame 22 and to the engine 28 of the snowmobile 20. In one embodiment, the cooling system 300 includes several coolant branches driven by the coolant pump 304. The coolant pump 304 has a coolant inlet port 308 and a coolant outlet port 312.

A first cooling system branch begins at the outlet port 312 and includes a coolant passage 316 that extends between the outlet port 312 and the engine 28. A portion of the coolant supplied by the coolant pump 304 is provided through the coolant passage 316 and is circulated through the engine body to cool various components thereof. A plurality of coolant passages 320 extend between the engine 28 and a coolant merge passage 324. The coolant merge passage 324 is connected to a temperature regulator 328 through which the coolant in the cooling system 300 flows. A coolant passage 332 extends between the temperature regulator 328 and the inlet port 308 of the coolant pump 304. When the engine 28 is first started and is, therefore, cold, most of the coolant is circulated through this first branch of the cooling system 300. As the temperature of the engine 28 rises, at least a portion of the coolant is circulated through a second coolant branch.

The second coolant branch includes a coolant supply, such as the coolant tank 336, a right-side heat exchanger 340, a left-side heat exchanger 344, the coolant pump 304, and coolant passages interconnecting each of these components. A coolant passage 348 that extends between the temperature regulator 328 and the coolant tank 336 carries coolant from the first coolant branch to the coolant tank 336. A coolant passage 352 that extends between the coolant tank 336 and the right-side heat exchanger 340 carries coolant to the heat exchanger 340. In one embodiment, the heat exchanger 340 is at least partially located proximate the right-side step 36. The heat exchanger 340 removes heat from the coolant in a known manner. A coolant passage 356 that extends between the right-side heat exchanger 340 and the left-side heat exchanger 344 carries coolant to the left-side heat exchanger 344. In one embodiment, the left-side heat exchanger 344 is located at least partially proximate the left-side step 38. As with the right-side heat exchanger 340, the left-side heat exchanger 344 removes heat from the coolant flowing therethrough. A coolant passage 360 extends between the left-side heat exchanger 344 and the inlet port 308 of the coolant pump 304 to carry coolant back to the coolant pump 304 for further circulation through the engine 28 and associated components.

In one embodiment, a third coolant branch is provided in the cooling system 300 to cool the lubricant that is circulated through the lubrication system of the engine. A coolant passage 364 branches off from the coolant passage 316 and extends to an inlet side of the lubricant cooler 244. A coolant passage 368 extends from an outlet side of the lubricant cooler 244 to the temperature regulator 328 and connects thereto. A portion of the coolant from the coolant pump 304 is delivered into the coolant passage 364. This coolant flows through the lubricant cooler 244, which includes a heat exchanger to transfer heat from the lubricant in the lubrication system to the coolant. In some running conditions, the lubricant can be warmed by the coolant flowing therethrough. After flowing through the lubricant cooler 244, the coolant is carried by the coolant passage 368 back to the temperature regulator 328 for further circulation in the cooling system.

In one embodiment, the cooling system 300 includes another branch that communicates with the charge former 96. A coolant passage 376 branches off from the coolant merge passage 324 and connects to an inlet side of a heat exchanger associated with the charge former 96. A coolant passage 380 extends from an outlet side of the heat exchanger associated with the charge former 96 to a secondary inlet 384 of the coolant pump 304. An auxiliary temperature regulator 388 is provided proximate the coolant passage 376 to control the flow of coolant therein.

Figure 6:
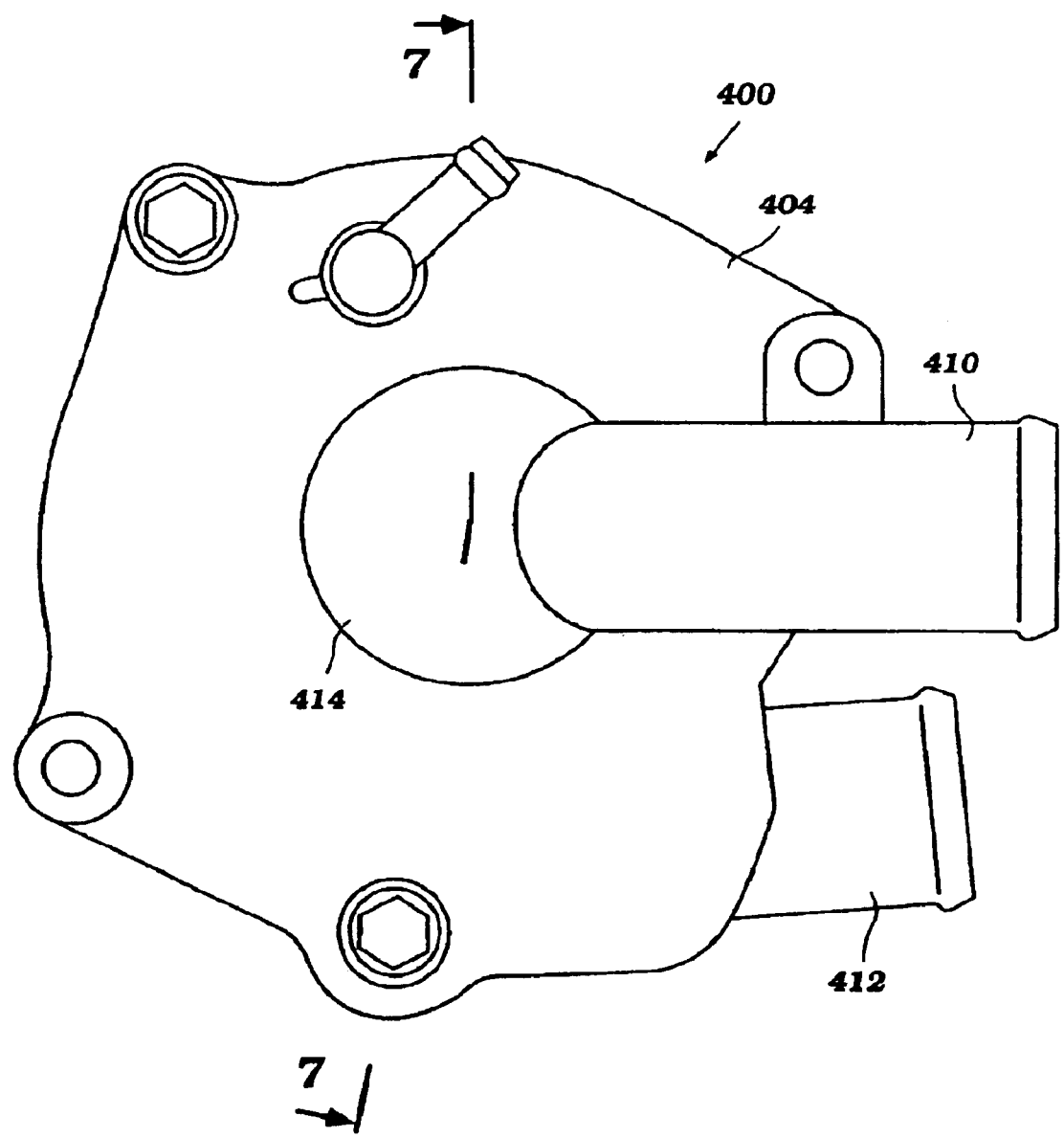
FIG. 6 is a conventional coolant pump.
Figure 7:
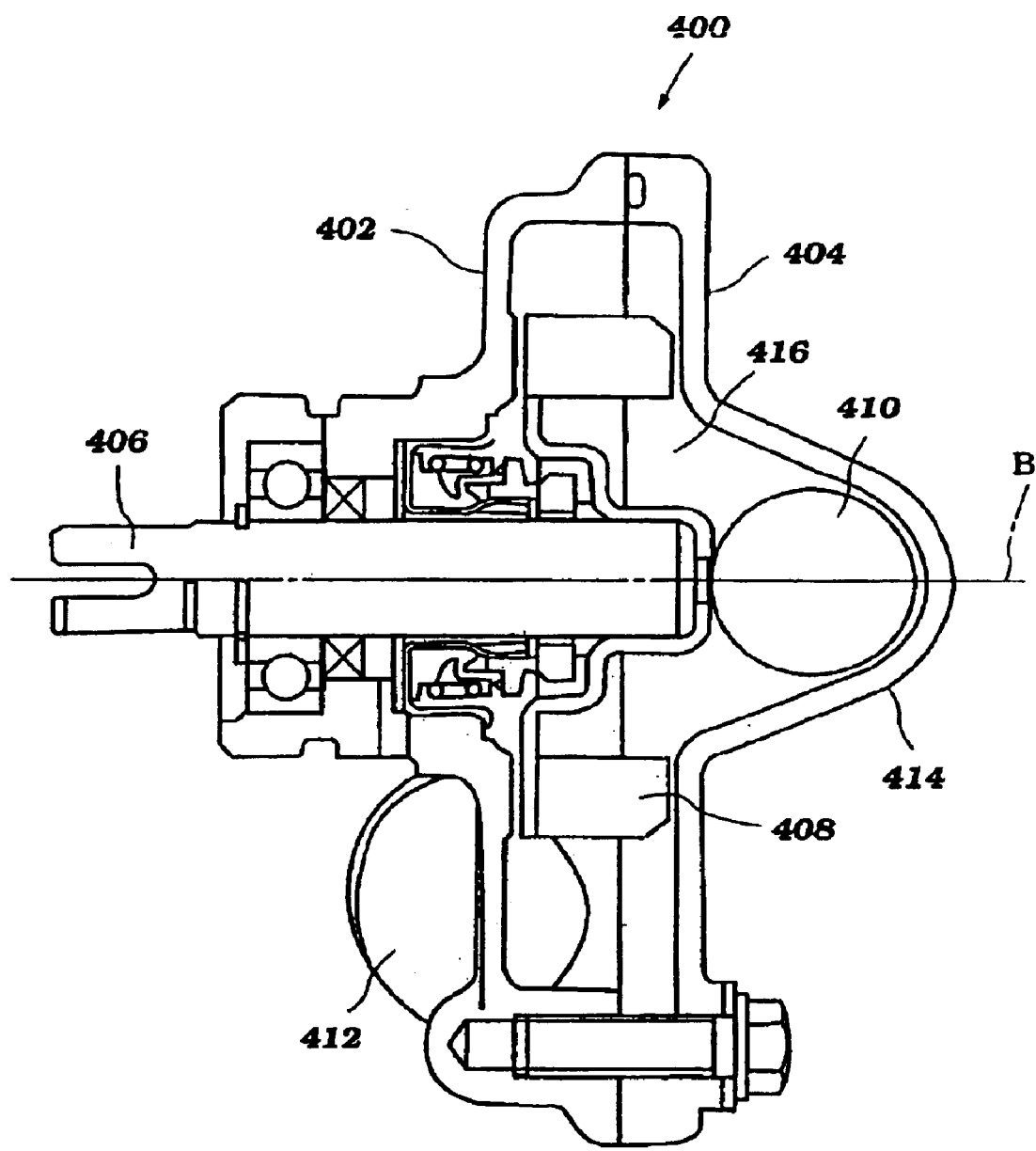
FIG. 7 is a cross-section view of the coolant pump of FIG. 6 taken along the line 7—7.
Figure 8:
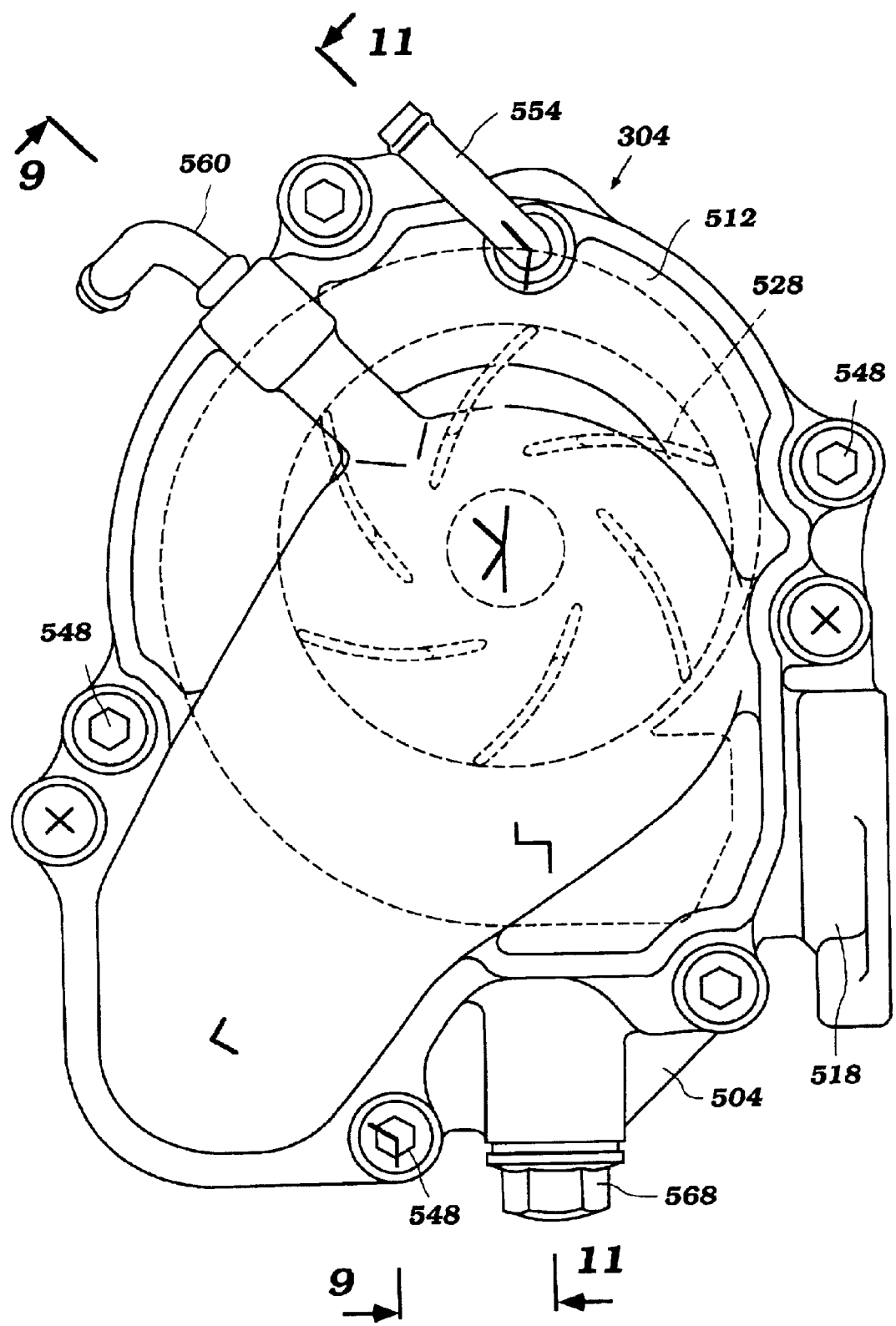
FIG. 8 is a plan view of one embodiment of a coolant pump.

With reference to FIGS. 6 and 7, a conventional centrifugal pump 400 is shown. The pump 400 includes a pump housing 402 and a lid 404. A shaft 406 is journaled with the pump housing 402 and rotates about an axis "A." Several blades 408 are secured to the pump drive shaft 406. An inlet 410 is provided in the lid 404. An outlet 412 is provided in the pump housing 402. The inlet 410 is unitarily connected to a protrusion 414 at the center of the lid 404. A pump chamber 416 is formed between the lid 404 and the pump housing 402. FIG. 7 shows that the conventional pump 400 is elongated in the direction of the axis "B." Thus, the pump 400 requires a significant amount of space for mounting.

With reference to FIGS. 8–13, one embodiment of the pump 304 that can be used in the cooling system 300 described herein is a centrifugal pump. The pump 304 includes a pump case main body 504 and a pump drive shaft 508 journaled in the pump case main body 504. The pump drive shaft 508 is journaled by a bearing 509. In one embodiment, a mechanical seal 510 and an lubricant seal 511 generally separate any lubricant that may be in the bearing 509, or in any other way associated with the pump drive shaft 504, from the coolant that passes through the pump 304. The seals 510, 511 also prevent the coolant from the cooling system 300 that is circulated by the pump 304 from leaking out into the surrounding environs. The pump drive shaft 508 is rotatable about a pump drive shaft axis "C."

Figure 9:
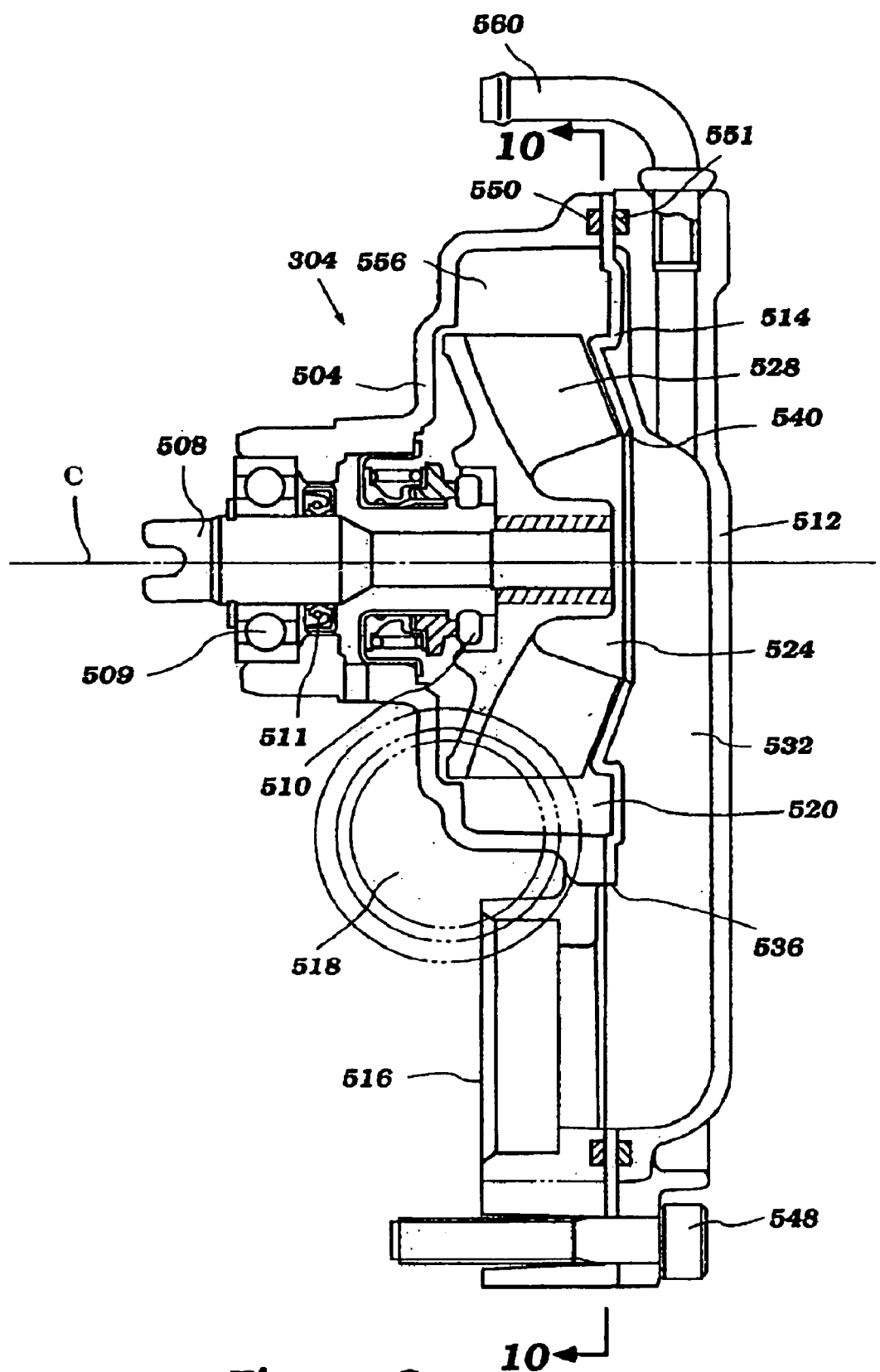
FIG. 9 is a cross-section view of the coolant pump of FIG. 8 taken along the line 9—9.

With reference to FIG. 9, the pump 304 also has a lid 512 and a partition member 514. In one embodiment, the pump case main body 504, the partition member 514, and the lid 512 are separate components that are secured when the pump 304 is assembled. In one embodiment, the pump case body 504 has a first mounting surface facing a second mounting surface of the partition member 514 and the partition 514 has a third mounting surface facing a fourth mounting surface of the lid 512. The second and third mounting surfaces preferably are on opposite sides of the partition member 514. The partition member 514 is located between the pump case main body 504 and the lid 512. In one embodiment, the partition member 514 includes at least one generally planar surface oriented generally perpendicularly to the pump drive shaft axis "C." A fluid inlet port 516 is provided on the pump 304 for ingress of coolant. In one embodiment, the fluid inlet port 516 is provided on the pump case main body 504. Of course, the fluid inlet port 516 could also be place elsewhere on the pump 304, e.g., on the lid 512. Similarly, a fluid outlet port 518 is provided on the pump 304 for egress of coolant. In one embodiment, the fluid outlet port 518 is provided on the pump case main body 504. As with the fluid inlet port 516, the fluid outlet port 518 could also be place elsewhere on the pump 304, e.g., on the lid 512.

Figure 10:
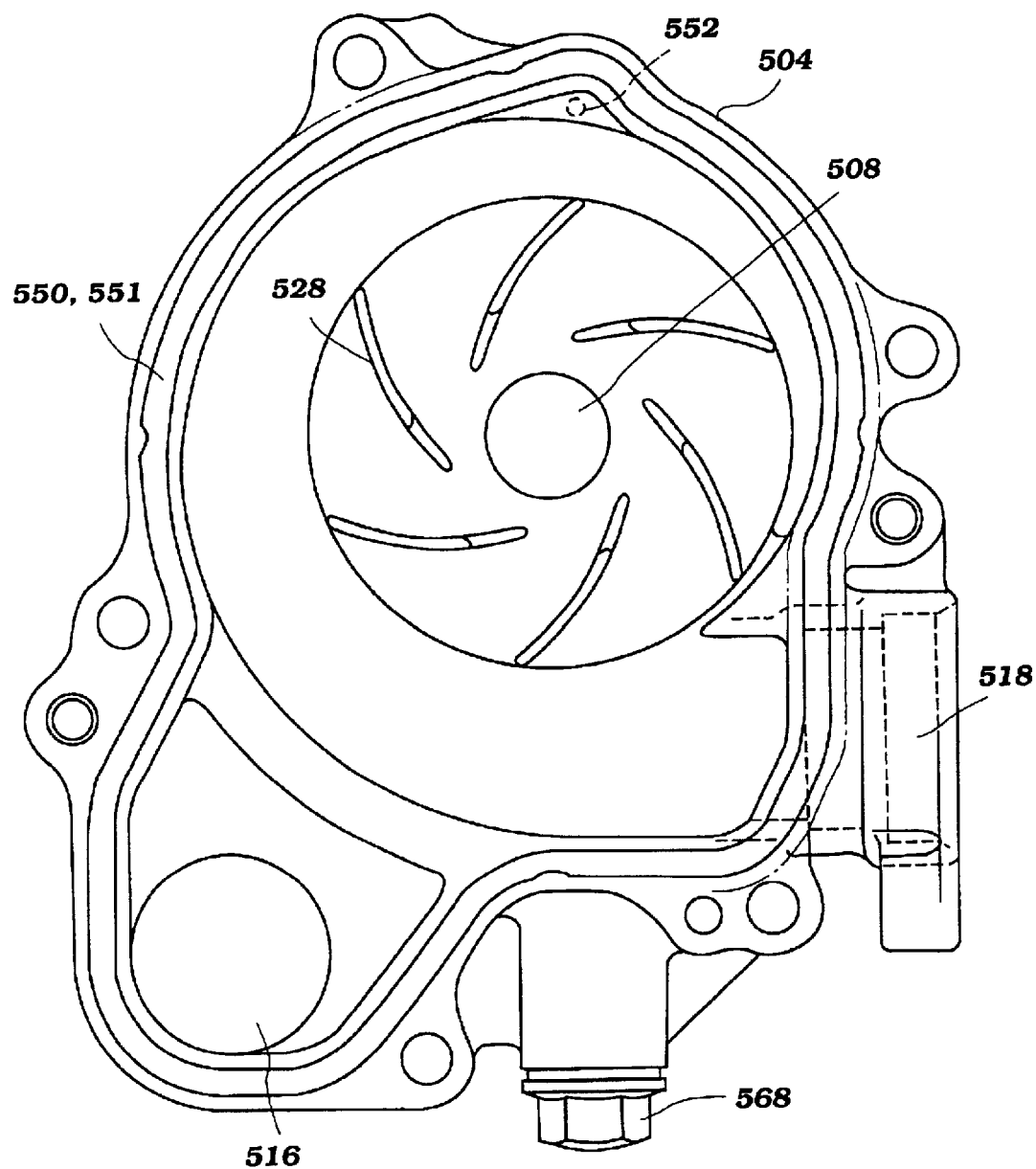
FIG. 10 is a partial cross-section view of the coolant pump of FIGS. 8 and 9 taken along the line 10—10.

The pump case main body 504 and the partition member 514 define a pump chamber 520. The pump chamber 520 includes a pump chamber inlet port 524. A plurality of blades 528 are mounted on the drive shaft 508 and are housed within the pump chamber 520. The embodiment shown includes six blades 528. One skilled in the art will recognize that more or less blades can be used within the scope of the claims below. FIG. 10 illustrates that the blades 528 advantageously have a generally arcuate profile. Of course other shapes can be used as well.

The partition member 514 and the lid 512 define a fluid inlet chamber 532. The fluid inlet chamber 532 is in fluid communication with the fluid inlet port 516 through a first opening 536 in the partition member 514. The fluid inlet chamber 532 is also in fluid communication with the pump chamber inlet port 524 through a second opening 540 in the partition member 514.

In one embodiment, the pump case main body 504, the partition member 514, and the lid 512 are secured together. These components can be secured together in a conventional manner, e.g., by one or more bolts 548. Preferably, when the pump case main body 504, the partition member 514, and the lid 512 are assembled, a water-tight seal is formed around the perimeter of the pump 304. In one embodiment, such a seal is achieved by positioning a first O-ring 550 between the partition member 514 and the pump case main body 504 proximate the outer perimeter of the pump 304 and by positioning a second O-ring 551 between the partition member 514 and the lid 512 proximate the outer perimeter of the pump 304.

Figure 11:
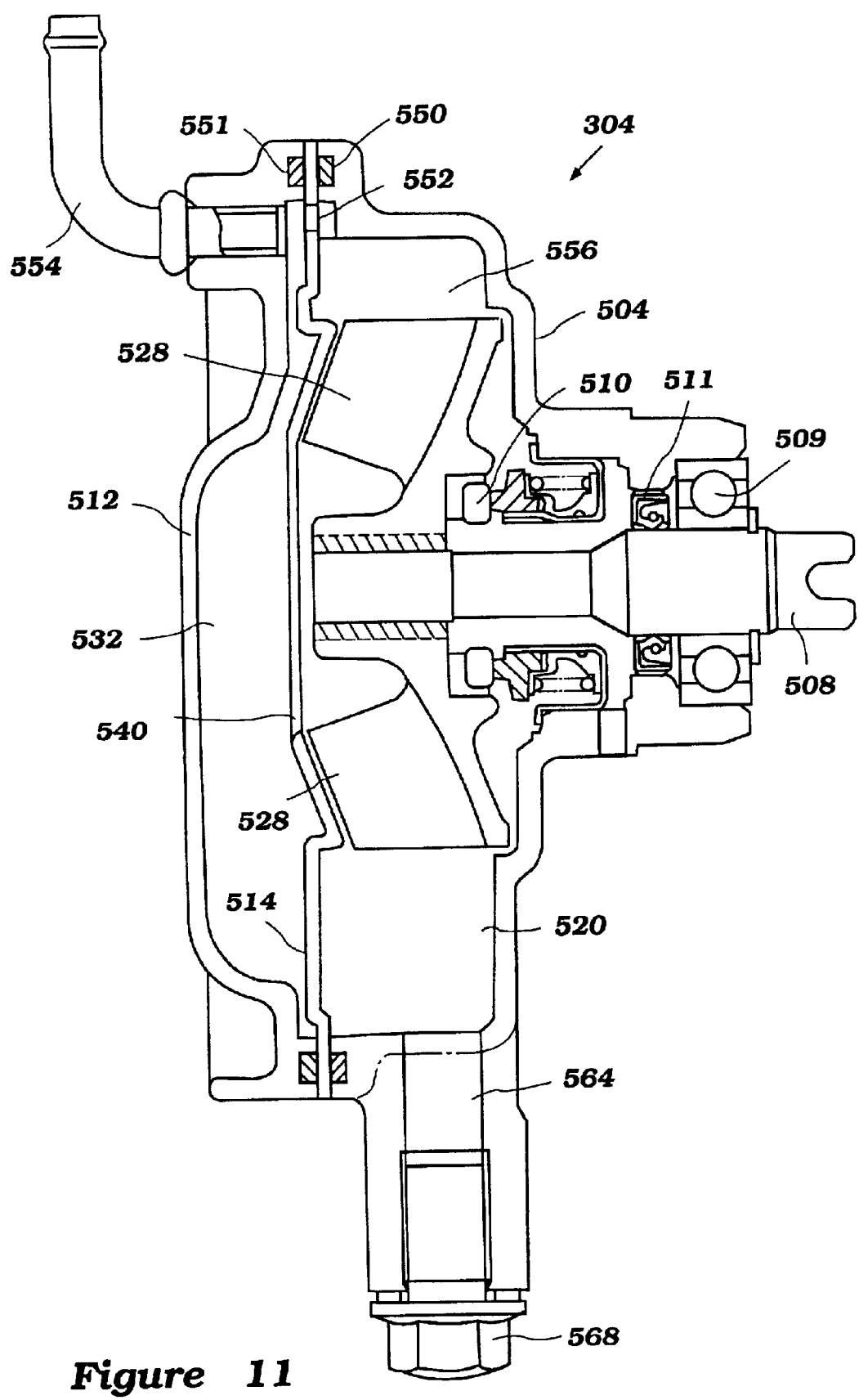
FIG. 11 is a cross-section view of the coolant pump of FIG. 8 taken along the line 11—11.
Figures 12, 13:
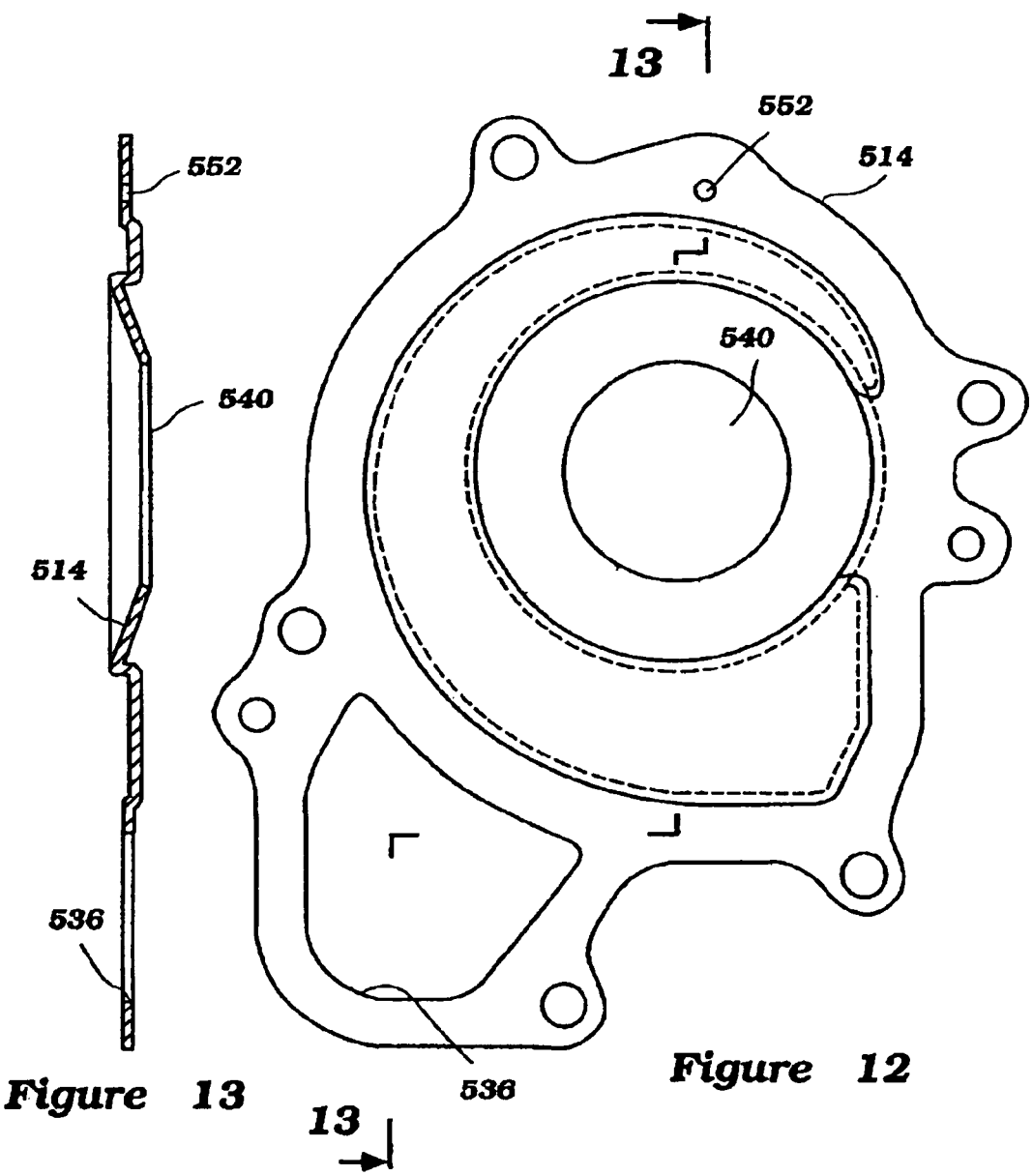
FIG. 12 is a plan view of one embodiment of a partition member of the coolant pump of FIG. 8.
FIG. 13 is a cross-section view of the partition member of FIG. 12 taken along the line 13—13.

With reference to FIG. 11, one embodiment of the coolant pump 304 has a partition member 514 that includes a auxiliary passage 552. The auxiliary passage 552 provides fluid communication between the fluid inlet chamber 532 of the pump 304 and an upper portion 556 of the pump chamber 520. The auxiliary passage 552 is a through-hole in the partition 514 in one embodiment. While the auxiliary passage 552 is shown in an upper portion of the partition 514, it could be located elsewhere as well. The auxiliary passage 552 provides for fluid communication with a breather passage 554. The breather passage 554 dissipates pressure in the pump 304 by communicating with the atmosphere. The breather passage 554 can also act as an auxiliary drain port for the pump chamber 520.

In one embodiment, the lid 512 also includes a secondary fluid inlet 560. The fluid inlet 560 communicates with the fluid inlet chamber 532 in one embodiment. In one embodiment, the secondary inlet 560 is similar to the inlet 384 described above in connection with the cooling system 300.

In another embodiment, the pump 304 includes a coolant drain 564. One arrangement of a coolant drain 564 provides a passage that extends downward from the pump chamber 520. The passage is sealed, in part, by a bolt 568. To drain the pump chamber 520 of the pump 304, the bolt 568 is removed. It should be recognized that other shapes of the coolant drain 564 are possible so long as fluid communication is provided between the pump chamber 520 and the atmosphere. In another embodiment, the coolant drain 564 could provide for fluid communication between the fluid inlet chamber and the atmosphere.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A snowmobile comprising:
   a frame assembly;
   an internal combustion engine mounted to the frame assembly, the internal combustion engine comprising:
      a cylinder block defining a cylinder bore;
      a crankcase connected to the cylinder block defining a crankcase chamber, the crankcase having a crankshaft journaled therein, the crankshaft rotatable about a crankshaft axis;
      a piston reciprocally positioned in the cylinder bore, the piston driving the crankshaft; and
      a cooling system having a centrifugal coolant pump, the centrifugal coolant pump located in the crankcase, the centrifugal coolant pump comprising:
         a lid;
         a pump case main body, a pump drive shaft journaled in the pump case main body, the pump drive shaft being rotatable about a pump drive shaft axis, a plurality of blades mounted on the pump drive shaft, at least a portion of the drive shaft being interposed between the cylinder block and the lid;
         a partition member defining at least a portion of a pump chamber inlet port, the partition member and the pump case main body defining a pump chamber configured to house the blades; and
         a fluid inlet chamber defined by the partition member and the lid, the fluid inlet chamber providing fluid communication between a fluid inlet port and the pump chamber inlet port.

2. A snowmobile comprising:
   a frame assembly defining a longitudinal vertical plane and a transverse vertical plane;
   an internal combustion engine mounted to the frame assembly generally along the transverse vertical plane, the internal combustion engine comprising:
      a cylinder block defining a cylinder bore;
      a crankcase connected to the cylinder block defining a crankcase chamber, the crankcase having a crankshaft journaled therein, the crankshaft rotatable about a crankshaft axis;
      a piston reciprocally positioned in the cylinder bore, the piston driving the crankshaft; and
      a cooling system having a centrifugal coolant pump, the centrifugal coolant pump located in the crankcase, the centrifugal coolant pump comprising:
         a pump housing defining a pump chamber that is in fluid communication with a fluid inlet port, the pump housing comprising:
            a pump case main body, the pump drive shaft journaled in the pump case main body;
            a partition member comprising an upper portion and defining a pump chamber inlet port, the partition member and the pump case main body defining the pump chamber, the partition member further comprising a auxiliary passage that provides fluid communication between a fluid inlet chamber and the pump chamber;
            a lid;
            the fluid inlet chamber defined by the partition member and the lid, the fluid inlet chamber providing fluid communication between the fluid inlet port and the pump chamber inlet port; and
         a pump drive shaft journaled in the pump housing, the pump drive shaft being rotatable about a pump drive shaft axis, the pump drive shaft having at least one blade mounted thereon, the blade positioned within the pump chamber;
      wherein the fluid inlet port is offset from the pump drive shaft axis.

3. The snowmobile of claim 2, wherein the auxiliary passage comprises a through-hole located in the upper portion of the partition member.

4. A coolant pump for an engine cooling system, the pump comprising:
   a pump case main body, a pump drive shaft journaled in the pump case main body, the pump drive shaft being rotatable about a pump drive shaft axis, a plurality of blades mounted on the pump drive shaft;
   a partition member comprising an upper portion and, the partition member and the pump case main body defining a pump chamber configured to house the blades, the partition member defining a pump chamber inlet port, the partition member further comprising a auxiliary passage that provides fluid communication between a fluid inlet chamber and the pump chamber;
   a lid; and
   the fluid inlet chamber defined by the partition member and the lid, the fluid inlet chamber providing fluid communication between a fluid inlet port and the pump chamber inlet port.

5. The coolant pump of claim 4, wherein the auxiliary passage comprises a through-hole located in the upper portion of the partition member.

6. A snowmobile comprising:
   a frame assembly defining a longitudinal vertical plane and a transverse vertical plane;
   an internal combustion engine mounted to the frame assembly generally along the transverse vertical plane, the internal combustion engine comprising:
      a cylinder block defining a cylinder bore;

a crankcase connected to the cylinder block defining a crankcase chamber, the crankcase having a crankshaft journaled therein, the crankshaft rotatable about a crankshaft axis;

a piston reciprocally positioned in the cylinder bore, the piston driving the crankshaft; and a cooling system having a centrifugal coolant pump, the centrifugal coolant pump located in the crankcase, the centrifugal coolant pump comprising:

a pump housing comprising:

a pump case main body defining a first mounting surface;

a partition member defining a pump chamber inlet port and comprising a peripheral region defining a second mounting surface and a third mounting surface, the second and third mounting surfaces being on opposite sides of the partition member, the partition member and the pump case main body defining a pump chamber;

a lid defining a fourth mounting surface;

a fluid inlet chamber defined by the partition member and the lid, the fluid inlet chamber providing fluid communication between a fluid inlet port and the pump chamber inlet port; and a pump drive shaft journaled in the pump case main body, the pump drive shaft being rotatable about a pump drive shaft axis, the pump drive shaft having at least one blade mounted thereon, the blade positioned within the pump chamber;

wherein the fluid inlet port is offset from the pump drive shaft axis, the first mounting surface faces the second mounting surface, and the third mounting surface faces the fourth mounting surface.

7. The snowmobile of claim 6, wherein the partition member comprises a generally planar surface oriented generally perpendicular to the pump drive shaft axis.

8. The snowmobile of claim 6, wherein the fluid inlet port is positioned on the pump case main body.

9. The snowmobile of claim 6, wherein the coolant pump further comprises a coolant drain.

10. The coolant pump of claim 9, wherein the coolant drain is in fluid communication with the pump chamber.

11. The snowmobile of claim 6, wherein the pump is removable from the internal combustion engine.

12. The snowmobile of claim 6, wherein the lid defines a portion of an outside surface of the internal combustion engine intersected by the pump drive shaft axis.

13. The snowmobile of claim 6, wherein the pump drive shaft is interposed between the cylinder block and the lid.

14. The snowmobile of claim 6, wherein the at least one blade is interposed between the fluid inlet chamber and the cylinder block.

15. The snowmobile of claim 6, further comprising a seal between the first and second mounting surfaces.

16. The snowmobile of claim 6, further comprising a seal between the third and fourth mounting surfaces.

17. The snowmobile of claim 16, further comprising a seal between the first and second mounting surfaces.

18. A coolant pump for an engine cooling system, the pump comprising:

a pump case main body, a pump drive shaft journaled in the pump case main body, the pump drive shaft being rotatable about a pump drive shaft axis, a plurality of blades mounted on the pump drive shaft, the pump case main body defining a first mounting surface;

a partition member comprising a pump chamber inlet port and a peripheral region, the peripheral region defining a second mounting surface and third mounting surface, the partition member and the pump case main body defining a pump chamber configured to house the blades;

a lid comprising a fourth mounting surface;

a fluid inlet chamber defined by the partition member and the lid, the fluid inlet chamber providing fluid communication between a fluid inlet port and the pump chamber inlet port;

wherein when assembled, the first mounting surface faces the second mounting surface and the third mounting surface faces the fourth mounting surface.

19. The coolant pump of claim 18, further comprising a fluid inlet passage extending between the fluid inlet chamber and the pump chamber inlet port.

20. The coolant pump of claim 18, wherein the partition member comprises a generally planar surface oriented generally perpendicular to the pump drive shaft axis.

21. The coolant pump of claim 20, wherein the fluid inlet port is positioned on the pump case main body.

22. The coolant pump of claim 18, wherein the fluid inlet port is positioned on the pump case main body.

23. The coolant pump of claim 18, further comprising a coolant drain.

24. The coolant pump of claim 23, wherein the coolant drain is in fluid communication with the pump chamber.

25. The coolant pump of claim 23, wherein the coolant drain is in fluid communication with the fluid inlet chamber.

\* \* \* \* \*

UNITED STATES PATENT AND TRADEMARK OFFICE
CERTIFICATE OF CORRECTION

PATENT NO. : 6,892,844 B2
DATED : May 17, 2005
INVENTOR(S) : Mamoru Atsuumi

It is certified that error appears in the above-identified patent and that said Letters Patent is hereby corrected as shown below:

<u>Title page,</u>
Item [73], Assignee, change "Yamaha Hatsukoki Kabushiki Kaisha" to -- Yamaha Hatsudoki Kabushiki Kaisha --.

Signed and Sealed this

Twentieth Day of December, 2005

JON W. DUDAS
*Director of the United States Patent and Trademark Office*